(No Model.)
C. H. TRASK.
METHOD OF MAKING RIGHT AND LEFT ROTARY CUTTERS.
No. 372,049. Patented Oct. 25, 1887.
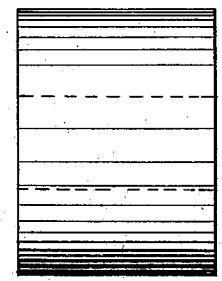
Fig. 1.
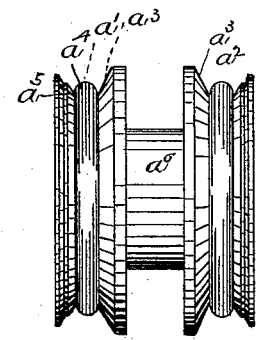
Fig. 2.
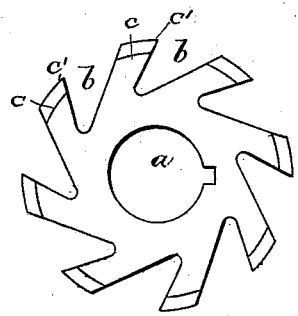
Fig. 3.
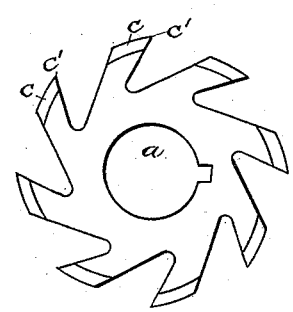
Fig. 4.
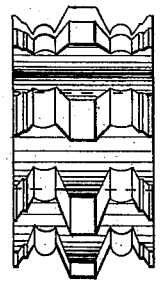
Fig. 6.
Fig. 5.
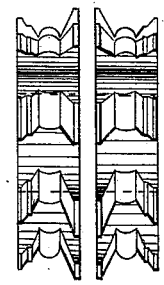
Fig. 7.
WITNESSES.
INVENTOR.

UNITED STATES PATENT OFFICE.

CHARLES H. TRASK, OF LYNN, MASSACHUSETTS, ASSIGNOR TO THE DUPLEX SHOE TRIMMER COMPANY, OF PORTLAND, MAINE.

METHOD OF MAKING RIGHT AND LEFT ROTARY CUTTERS.

SPECIFICATION forming part of Letters Patent No. 372,049, dated October 25, 1887.

Application filed February 8, 1887. Serial No. 226,906. (No model.)

*To all whom it may concern:*

Be it known that I, CHARLES H. TRASK, of Lynn, in the county of Essex and State of Massachusetts, a citizen of the United States, have invented a new and useful Improvement in the Process of Manufacturing Right and Left Cutters for Duplex Sole Edge-Trimming Machines, of which the following is a full, clear, and exact description, reference being had to the accompanying drawings, forming a part of this specification, in explaining its nature.

The invention relates especially to the herein-described process of making right and left cutters for duplex sole-edge-trimming machines, by which a saving in the cost of manufacture, as compared with the cost of the ordinary form of sole edge trimmer, is made.

The various steps of the process will be described in connection with the drawings, in which—

Figure 1 is a view in elevation of the partially-formed blank from which the cutters are made. Fig. 2 is a view in side elevation illustrating the block shaped into partially-formed cutters. Fig. 3 is a view in end elevation of the block shown in Fig. 2 after it has been submitted to a further forming operation. Fig. 4 is a view in end elevation showing the cutters "backed off." Fig. 5 is a view in side elevation illustrating the block as cut in two to form two complete cutters. Figs. 6 and 7 illustrate the steps of the process when it is desired to produce right and left cutters without hubs.

In my application for Letters Patent of the United States, filed October 4, 1886, Serial No. 215,254, allowed January 8, 1887, I have described a duplex sole and heel edge trimming machine which has, among other things, a shaft bearing at each end a rotary sole-edge trimmer, and this shaft is represented as rotated by a pulley and belt, so that both trimmers are rotated in the same direction; but as one trimmer is on the right side of the machine and the other on the left side of the machine it follows that, as they both rotate in the same direction, one must be a right trimmer and the other a left trimmer—that is, they must be shaped in relation to each other substantially as shown in Figs. 5 and 7.

The manufacture of the ordinary form of sole-edge rotary trimmer, which may be called a "right" trimmer, is somewhat expensive, and the manufacture of a left trimmer in the same manner would of course cost as much more, provided it was made in the same way as a single right one, and I have discovered a method of manufacturing them by which the cost of the two cutters may be quite materially reduced. To accomplish this, I take a metal block of suitable size and temper and of a length adapted either to make the cutters with hubs, as represented in Fig. 5, or the cutters without hubs, as represented in Figs. 6 and 7. This block as prepared for use is substantially cylindrical in shape, and it is first bored centrally to provide a shaft-hole, $a$. (See Figs. 1 and 5.) It is then mounted on an arbor and submitted to the operation of a suitable turning tool or tools, whereby there are formed, preferably simultaneously, in the surface of the block the two opposing cutter-forming sections $a'\ a^2$, each of which comprises or has these features: first, the inclined section or part $a^3$, which forms the welt or upper sole-edge or corner trimming section of the complete cutter; second, the intermediate section or part, $a^4$, which is adapted to operate upon the side edge of the sole and is the reverse of the shape which it is desired to give the edge of the sole; and, third, the section or part $a^5$, which in the cutter is adapted to bear upon and trim the lower edge or corner of the sole.

When the cutters are provided with hubs, a hub-section, $a^6$, as represented in Fig. 2, between the two reverse sections of the partially-formed cutters is formed, preferably simultaneously or substantially simultaneously with the formation of these other sections. The partially-formed block is then submitted to the operation of a suitable milling-tool, whereby there is formed across the parts of the block which form the cutters recesses $b$, which extend inward from the circumference of these sections across the sections $a^3\ a^4\ a^5$, and which are shaped substantially as represented in Fig. 3. These recesses form the cutting-teeth $c$, and these teeth are completed by cutting them back from the cutting-edges $c'$, so that the edge $c'$ is farther removed from the center of the trimmer than any other part of the teeth. These teeth are formed in the cutters at the same time—that is, the tool is arranged to run across both cutters when the partially-formed block is presented to the tool—so that its operation is continuous from one end of the partially-formed block to the other, excepting, of course, when the trimmers are provided with a hub, as represented in Fig. 2; and when the block is formed with a hole, as shown in Fig. 2, two milling or similar tools may be employed at the same time to operate separately upon each cutter, and so that two cuts—one across the section $a'$ and the other across the section $a^2$—are being simultaneously formed. This produces a block having duplex or double cutters, the cutting-sections of which are opposed to each other, and two independent cutters are formed by dividing each block in two, which, in case of the construction having the hub, will produce the right cutter, A, and left cutter, B, each of which will have the hub $d$, as represented in Fig. 5; or, when hubs are not required, two cutters without hubs, as represented in Fig. 5.

Of course the form of the edge configuration of each trimmer—namely, of the sections $a^3$ $a^4$ $a^5$—may be changed or varied at will without departing from the essential features of the invention.

The cutters thus formed are adapted, the right cutter to be used upon the right end of a common operating shaft and upon the right side of the frame, and the left cutter on the left end of the same shaft and upon the left side of the supporting-frame.

The advantages of the invention arise from the fact that the various steps employed enable the two right and left cutters to be produced more cheaply than if the cutters were made separately from separate cutter-blocks.

It is not essential that the teeth $c$ be backed off before the block is cut in two to form the two separate trimmers, although I prefer that this be done at this time.

I would say further that I do not confine the process to the production of a trimmer intended for sole edge trimming, as it may be used for the production of right and left cutters or trimmers of any other character or description.

I would further say that the block shown in Fig. 1 may first be cut into two parts before it is mounted on the arbor and presented to the turning-tool. The turning-tool employed, preferably, is of the length of the block, and has two oppositely-shaped cutting-sections formed therein to simultaneously shape the two sections $a'$ $a^2$.

Having thus fully described my invention, I claim and desire to secure by Letters Patent of the United States—

1. The method of making right and left rotary sole-edge cutters which involves the formation in a metal block having the proper or desired length and size of two opposing partially-formed sections, $a'$ $a^2$, and then forming in said sections the cross-recesses $b$, extending from end to end of the block and separating the block into two parts, or right and left cutters, substantially as described.

2. The method of forming right and left rotary cutters which involves the shaping of a metal block of suitable length and size to produce the oppositely-formed sections $a'$ $a^2$ and the hub $a^6$, then cutting across said sections the recesses $b$, to form the teeth $c$, and separating the block into two parts upon a line taken through the hub to produce a right and left trimmer, each provided with a hub, as and for the purposes described.

3. The method of making right and left sole-edge trimmers which involves the forming in a metal block having the proper or desired length and size of two opposing partially-formed cutting sections, then forming in said sections the cross-recesses $b$, extending from end to end of the block, and then backing off the teeth of the two cutters and separating the block into two parts, or right and left cutters, substantially as described.

4. In the method of making right and left sole-edge trimmers, the steps which involve the simultaneous forming in a block or blocks of metal of two oppositely partially-formed trimmers, and the partial formation of the teeth thereof by the removal of the metal of the block through said partially-formed oppositely-arranged sections, as and for the purposes described.

CHARLES H. TRASK.

In presence of—
F. F. RAYMOND, 2d,
FRED. B. DOLAN.